United States Patent
Arrouy et al.

(10) Patent No.: US 11,479,331 B2
(45) Date of Patent: Oct. 25, 2022

(54) TRACTION SYSTEM COMPRISING AT LEAST TWO CAPTIVE SAILS WITH A MAST PROVIDED WITH DISTINCT MOORING MEANS EACH DEDICATED TO ONE SAIL

(71) Applicant: AIRSEAS, Nantes (FR)

(72) Inventors: Pascal Arrouy, Aucamville (FR); Jeremy Braines, Pibrac (FR); Emmanuel Cortet, Le Haillan (FR); Benoit Gagnaire, Fonsorbes (FR); Jean-Marc Ortega, Blagnac (FR); Jérôme Rigaud, Coufouleux (FR); Vianney Hiver, Toulouse (FR)

(73) Assignee: Airseas, Nantes (FR)

( * ) Notice: Subject to any disclaimer, the term of this patent is extended or adjusted under 35 U.S.C. 154(b) by 0 days.

(21) Appl. No.: 16/973,953

(22) PCT Filed: Jun. 7, 2019

(86) PCT No.: PCT/FR2019/051389
§ 371 (c)(1),
(2) Date: Dec. 10, 2020

(87) PCT Pub. No.: WO2019/239045
PCT Pub. Date: Dec. 19, 2019

(65) Prior Publication Data
US 2021/0253209 A1    Aug. 19, 2021

(30) Foreign Application Priority Data

Jun. 11, 2018  (FR) .................................... 1855077

(51) Int. Cl.
*B63H 9/072*    (2020.01)
*B63B 15/00*    (2006.01)
(Continued)

(52) U.S. Cl.
CPC .......... *B63H 9/072* (2020.02); *B63B 15/0083* (2013.01); *B63H 9/069* (2020.02); *B63H 9/10* (2013.01)

(58) Field of Classification Search
CPC ... B63H 8/16; B63H 8/10; B63H 8/12; B63H 8/14; B63H 9/072; B63H 9/069; B63H 9/10; B63H 8/18; B63B 15/0083
See application file for complete search history.

(56) References Cited

U.S. PATENT DOCUMENTS

| | | | | |
|---|---|---|---|---|
| 5,435,259 | A | * 7/1995 | Labrador | .................. F03D 9/32 114/39.31 |
| 2009/0266283 | A1 | * 10/2009 | Wrage | .................... B63H 9/069 114/102.12 |
| 2011/0041747 | A1 | * 2/2011 | Reusch | .................. B63H 9/072 114/39.11 |

FOREIGN PATENT DOCUMENTS

| | | |
|---|---|---|
| DE | 102015111224 A1 | 1/2017 |
| EP | 1740453 B1 | 5/2010 |

(Continued)

OTHER PUBLICATIONS

Search Report issued in French Patent Application No. 1855077 dated Jan. 30, 2019.

(Continued)

*Primary Examiner* — Andrew Polay
(74) *Attorney, Agent, or Firm* — Defillo & Associates, Inc.; Evelyn A. Defillo

(57) ABSTRACT

A traction system, notably for a ship, includes a fixed station, at least one first sail and one second sail, the first sail comprising a wing and being connected to a winch of the fixed station by a first hauling cable, the second sail includes a second wing and being connected to a winch of the fixed station by a second hauling cable. The fixed station includes a mast which is equipped with a first conveyor dedicated to (Continued)

mooring the first wing to this mast and with a second conveyor dedicated to mooring the second wing to this mast.

10 Claims, 4 Drawing Sheets

(51) Int. Cl.
  *B63H 9/10* (2006.01)
  *B63H 9/069* (2020.01)

(56) References Cited

FOREIGN PATENT DOCUMENTS

| WO | 2005100148 A1 | 10/2005 |
| WO | 2005100150 A1 | 10/2005 |

OTHER PUBLICATIONS

International Search Report for Application No. PCT/FR2019/051389 dated Dec. 12, 2019.
Written Opinion for PCT/FR2019/051389 dated Dec. 12, 2019.

* cited by examiner

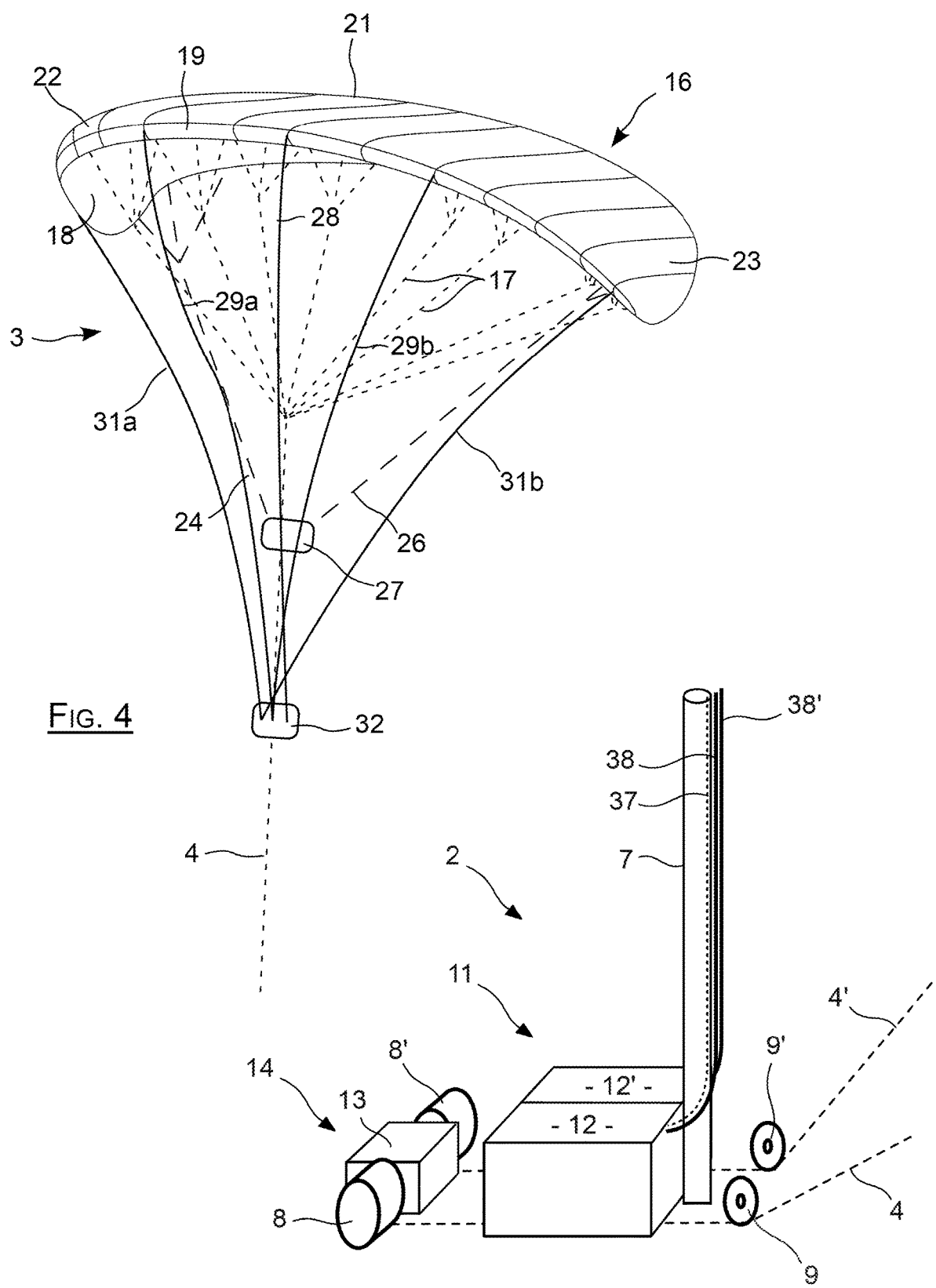

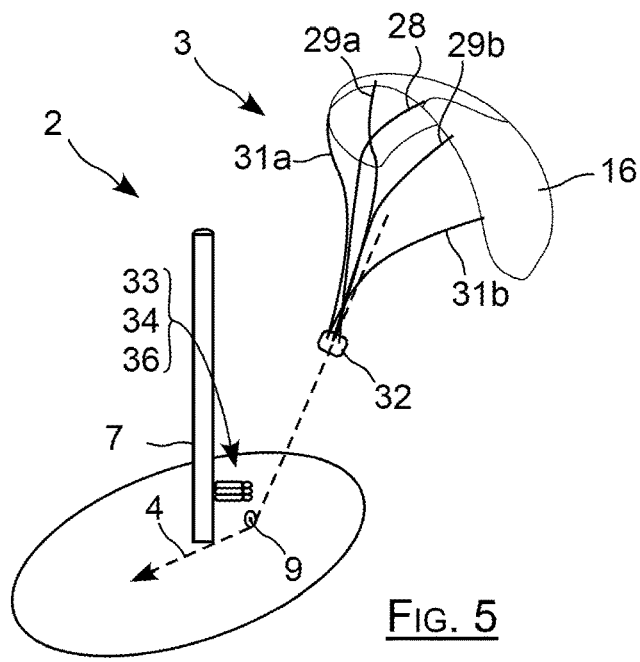
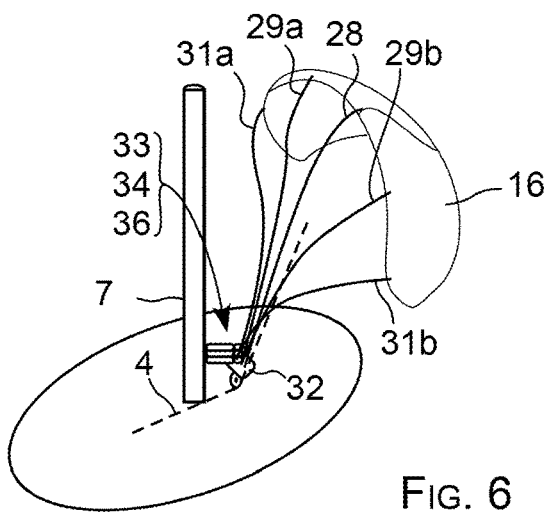
FIG. 5
FIG. 6
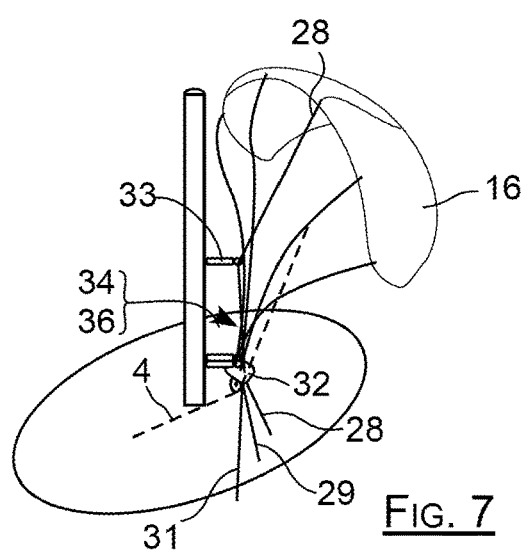
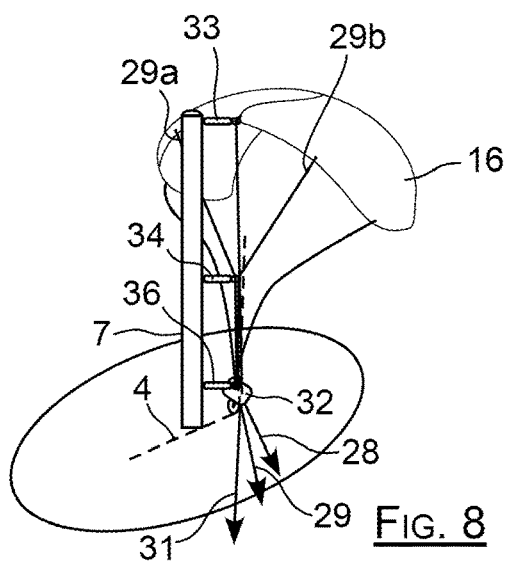
FIG. 7
FIG. 8
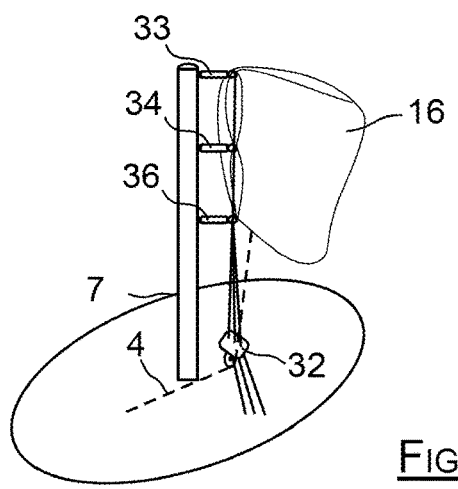
FIG. 9

TRACTION SYSTEM COMPRISING AT LEAST TWO CAPTIVE SAILS WITH A MAST PROVIDED WITH DISTINCT MOORING MEANS EACH DEDICATED TO ONE SAIL

This is the National Stage of PCT international application PCT/FR2019/051389, filed on Jun. 7, 2019 entitled "TRACTION SYSTEM COMPRISING AT LEAST TWO CAPTIVE SAILS WITH A MAST PROVIDED WITH DISTINCT MOORING MEANS EACH DEDICATED TO ONE SAIL", which claims the priority of French Patent Application No. 1855077 filed Jun. 11, 2018, both of which are incorporated herein by reference in their entirety.

TECHNICAL FIELD

The invention relates to a traction system comprising at least two captive sails, intended in particular to fit a ship in order to tow it.

PRIOR ART

The invention more particularly relates to a system comprising sails said to be captive i.e. each one connected by a traction cable to an element such as a ship to an element such as a ship to be towed, as disclosed in FIG. 6 of European patent EP1740453. In this type of application, the sails used are of the type of sails used in kite-surfing or paragliding, these sails comprising a flexible wing with different control and connection lines to the traction cable.

Such a traction system can also be used as an energy converter by being installed on the ground, with each sail driving an electric generator rotated by the displacement of the cable due to the traction of the sail under the effect of the wind.

Typically, such an installation is installed in the front portion of the deck of a commercial ship of the cargo type, in order to provide it with traction in addition to its motorised propulsion system, in such a way as to significantly reduce the fuel consumption.

Such an installation has to make it possible to easily deploy each sail when the wind has a satisfactory orientation and intensity, and make it possible to easily bring back, moor and fold each sail, for example when the weather conditions are no longer suitable.

However, installing means for deploying, mooring and folding for each sail takes up too much space with regards to the space available at the front portion of the deck of a ship of the cargo type.

The purpose of the invention is to provide an arrangement that allows for the deployment and the mooring of several sails, while still having a size that is compatible with the space available in the front portion of a deck of a commercial ship.

DISCLOSURE OF THE INVENTION

To this effect, the invention has for object a traction system comprising a fixed station and at least one first sail and one second sail, the first sail comprising a wing and being connected to a winch of the fixed station by a first traction cable, the second sail comprising a second wing and being connected to a winch of the fixed station by a second traction cable, the fixed station including a mast carrying first means of mooring the first wing to this mast, and second means of mooring the second wing to this mast.

With this arrangement, a single fixed station which is relatively compact due to the fact that it comprises a single mast carrying the different means for mooring, is sufficient for deploying, bringing back, folding and storing several sails.

The invention also has for object a system thus defined, wherein the mast further carries first means for folding the first wing, and second means for folding the second wing.

The invention also has for object a system thus defined, wherein the first means for mooring and/or for folding the first wing comprise a first conveyor carrying first sliders sliding in a first rail, and wherein the second means for mooring and/or for folding the second wing comprise a second conveyor carrying second sliders sliding in a second rail.

The invention also has for object a system thus defined, wherein the first rail and the second rail comprise a common portion.

The invention also has for object a system thus defined, wherein the fixed station comprises a first winch receiving the first traction cable and a second winch receiving the second traction cable.

The invention also has for object a system thus defined, comprising a drive motor coupled to the two winches by means of transmission arranged to selectively drive one or the other of the two winches.

The invention also has for object a system thus defined, wherein the fixed station is mounted to be able to pivot about a vertical axis, with respect to the support on which this fixed station is installed.

The invention also has for object a system thus defined, wherein the first cable and the second cable have different lengths when the wings are in traction phase.

The invention also has for object a system thus defined, comprising means for steering configured to maintain each sail in an optimum position that maximises the traction generated by this sail, by repetitively describing eight-shaped trajectories passing through this optimum position.

The invention also has for object a system thus defined, wherein the means for steering are configured to de-phase the eight-shaped trajectories described by the two sails.

BRIEF DESCRIPTION OF THE DRAWINGS

FIG. 3 is an overview of a system according to the invention without its platform;

FIG. 4 is an overview of a sail according to the invention;

FIG. 5 is an overview of a sail approaching the fixed station in accordance with the invention;

FIG. 6 is an overview of a sail brought back to the fixed station in accordance with the invention;

FIG. 7 is an overview of a sail moored to the mast in accordance with the invention;

FIG. 8 is a sail at the beginning of the folding operation in accordance with the invention;

FIG. 9 is a folded sail according to the invention;

DETAILED DISCLOSURE OF PARTICULAR EMBODIMENTS

The idea at the base of the invention is to simultaneously use at least two sales to tow a ship while still providing a single platform for deploying and recovering these sails one after the other, ensuring optimum mutualisation of the means required for the deployment and the recovery of these sails.

In the example hereinafter, the invention is described for a system comprising two sails, but it applies just as well to a system comprising a larger number of sails.

Figure 1:
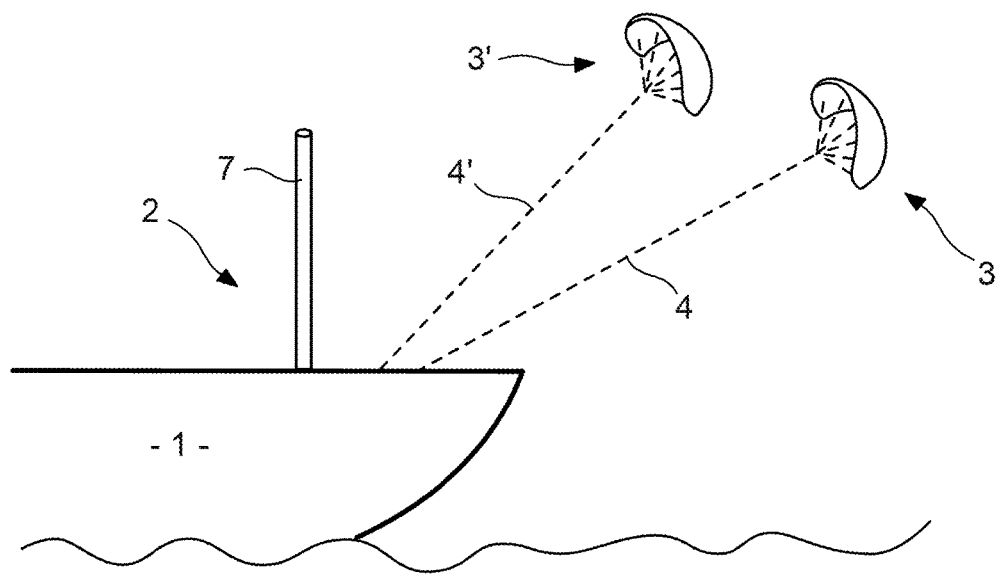
FIG. 1 is an overview of a system fitting a ship in accordance with the invention.

In FIG. 1, a ship 1 is fitted with a fixed station 2 according to the invention located in the front portion of its deck, and by which this ship 1 is towed by a first captive sail 3 to which it is connected by a first traction cable 4, and by a second captive sail 3' to which it is connected by a second traction cable 4'.

Figure 2:
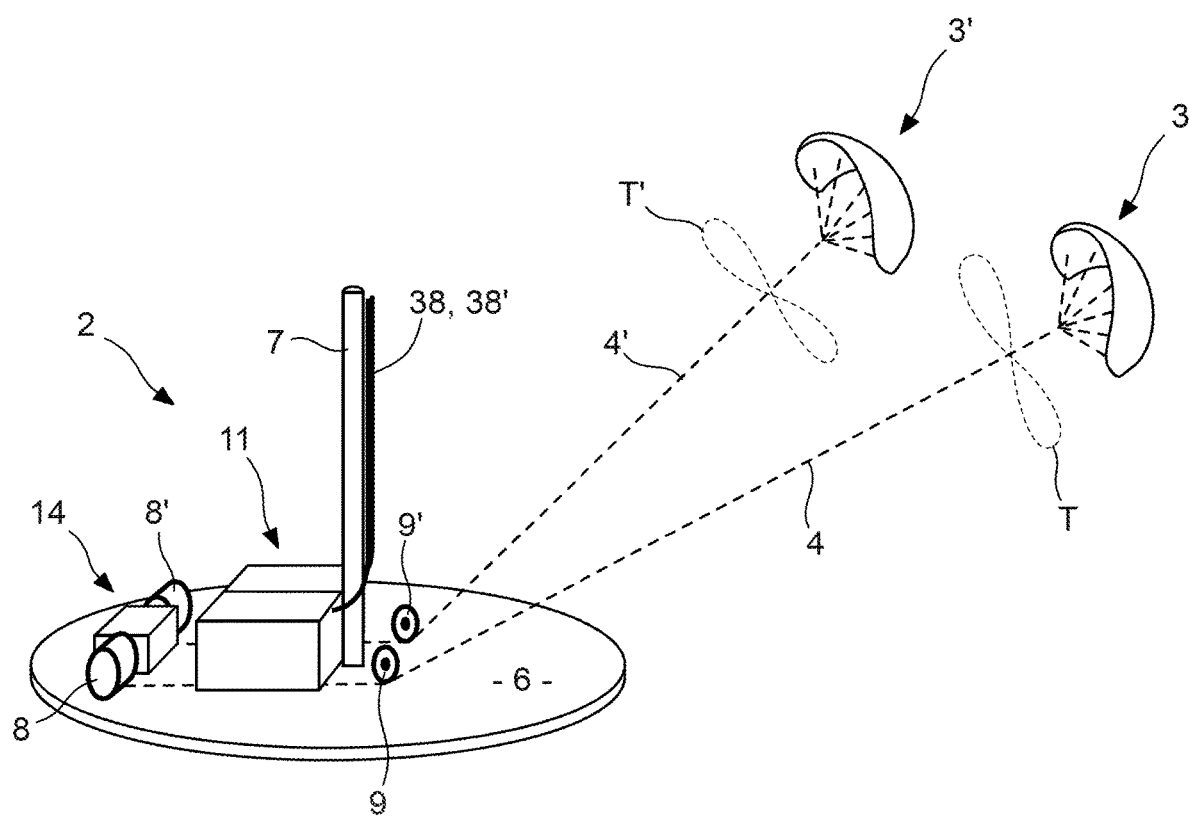
FIG. 2 is an overview of a system according to the invention.

The fixed station 2 that is shown alone in FIG. 2 comprises a platform 6 carrying a central mast 7 as well as a first winch 8 and a first hinged pulley 9 on its starboard half, and a second winch 8' and a second hinged pulley 9' on its port side half. The first cable 4 passes through the pulley 9 to be retained by the first winch 8, and the second cable 4' passes through the second pulley 9' to be retained by the second winch 8'.

Each cable is braked and blocked so as to transmit the traction forces to the ship, when the sails are deployed and in traction phase. As detailed in what follows, the mast 7 makes it possible to ensure the mooring, the folding and the storing of each sail, as well as the deployment thereof.

Additionally, a storage space 11 is located at the rear of the mast 7, between this mast and the set of winches, it comprises a first compartment 12 which extends over the starboard half of the platform, to receive the first sail 3, and a second compartment 12' extending over the port side half to receive the second sail 3'.

The platform 6 is advantageously fastened to the deck of the ship in such a way as to allow the station to rotate as a whole about a vertical axis in order to have an optimum orientation with respect to the wind when the sails are deployed, and/or when the sails are brought back to the fixed station to be moored, folded and stored there.

As can be seen more clearly in FIG. 3, a drive motor 13, for example electric, is provided between the winches 8 and 8', being connected to one and the other of the winches by a transmission system arranged to selectively drive one or the other of these winches. The unit formed by the winches and the motor forms a traction unit 14 that is separated from the mast by the storage space 11.

As can be seen in FIG. 4, the first sail 3 comprises a flexible wing 16 connected to the cable 4 by hangers 17 each one having an end connected to a lower face 18 of this wing 16 and another end connected to the traction cable 4.

The flexible wing 16 of the first sail 3 is formed from a set of assembled canvases, it comprises a leading edge 19 and a trailing edge 21 each extending from a left side 22 to a right side 23 of this wing, for an observer located facing the sail and with their back to the wind. The sail 3 is also fitted with two lateral sheets 24, 26 that have their ends fastened respectively to the left 22 and right 23 sides of the wing, their other ends being maintained by a control member 27 carried by the traction cable 4. This control member 27 makes it possible to manoeuvre and stabilise the wing autonomously, i.e. without an operator having to steer the sail.

This sail 3 is also fitted with a central upper line 28, a median pair of lateral folding lines 29a, 29b and a lower pair of lateral folding lines 31a, 31b. The upper line 28 comprises an upper end fastened to the middle of the leading edge 19, and a lower end carried by a base unit 32 which is itself carried by the traction cable 4.

The median lateral line 29a comprises an upper end fastened mid-way between the middle and the left end of the leading edge 19, and a lower end carried by the base unit 32. The median lateral line 29b is symmetric with the line 29a by comprising an end fastened mid-way between the middle and the right end of the leading edge, and another end carried by the base unit 32.

The lower lateral line 31a comprises an upper end fastened to the left end of the leading edge 19, and a lower end carried by the base unit 32. The lower lateral line 31b is symmetric with the line 31a, with an end fastened to the right end of the leading edge 19, and another end carried by the base unit 32.

The retour of the first sail 3 to the fixed station 2 is provided by placing it first to the vertical of the ship in order to reduce the traction that it exerts, this manoeuvre being managed by the control member 27, before controlling the first winch 8 in rotation to wind the cable 4 so as to bring the sail 3 back to the station 2.

The station is fitted with a first socket not shown for receiving the base unit 32 of the first sail 3, this first socket being passed through by the traction cable 4 which can be free to slide through the latter. At the end of the approach of the first sail 3, the base unit 32 of this first sail nests onto the first socket to be positioned and to be oriented in a precise manner with respect to the foot of the mast 7.

Additionally, the mast 7 carries a first conveyor 37 carrying sliders and sliding along a first rail 38, and which make it possible to provide the mooring, folding and storing of this first sail 3, these sliders being displaced in the rail 38 by the conveyor 37.

This first rail 38 more particularly guides an upper slider 33, a median slider 34 and a lower slider 36, which can be displaced along this mast 7 in the rail 38, each slider 33, 34, 36 being fitted at its free end with a deflection member which is a snap hook in the present case.

These sliders 33, 34, 36 are positioned in the lower portion of the mast 7 before the return of the first wing, such as for example during the approach thereof, shown in FIG. 5, to be facing the base unit 32 once the sail has been brought back to the fixed station.

At this stage, the snap hook fitted on the end of the upper slider is passed around the upper line 28, the snap hook of the median slider 34 is passed around the pair 29 of folding lines 29a and 29b, and the snap hook of the lower slider 36 is passed around the pair 31 of lower folding lines 31a, 31b, which corresponds to the situation of FIG. 6. For these operations, the snap hooks of the ends of the sliders are passed around lines by an operator or semi-automatically or automatically.

The sliders 33, 34 and 36 are then displaced by the first conveyor along the mast, as shown in FIG. 7, until reaching their reference positions, namely respectively the top of the mast, three-quarters of the height of the mast, and at mid-height of the mast, which corresponds to the situation of FIG. 8.

The upper line 28 is then pulled downwards by its lower end. The lower end of the line 28 passes for example through the base unit 32 to be made secure to the latter, while still able to be pulled from the lower face of this base unit 32 in such a way as to slide through the latter.

When the slider 33 has reached its high position and the line 28 has been fully pulled, the sail 3 is moored to the station 2, i.e. the centre of the leading edge of its wing 16 is maintained against the mast 7, which is the case in the configuration of FIG. 8.

The pair of folding lines 29 is then pulled downwards, under the base unit 32, to begin the folding of the wing by bringing back the left and right portions of its leading edge against the mast. Additionally, the pair of folding lines 31 is pulled downwards under the base unit 32 to bring the left and right ends of the wing 16 against the mast 7, in such a way as to terminate the folding as shown in FIG. 8. When the sail is folded, it has a configuration that corresponds to that of FIG. 9.

Each line or pair of folding lines is pulled downwards after connection of its end to a winch not shown, by an operator or semi-automatically or automatically.

The wing 16 of the first sail 3 is then stored by bring it back into the first compartment 12 of the storage space 11.

Figure 10:
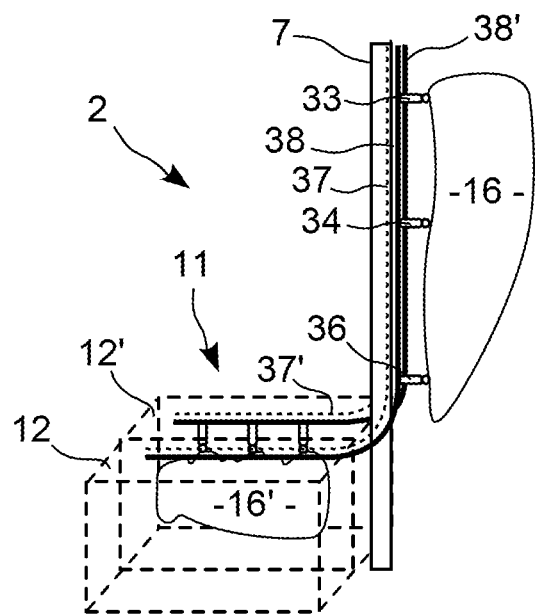
FIG. 10 is an overview of a system according to the invention before storage of the first sail in the storage space.
Figure 11:
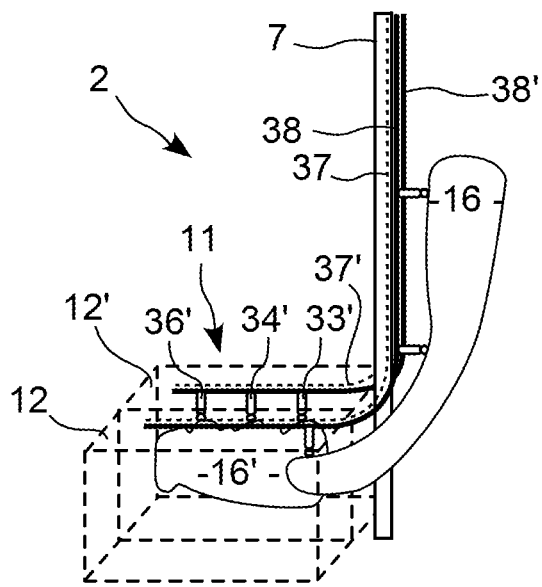
FIG. 11 is an overview of a system according to the invention during the storage of the first sail in the storage space.
Figure 12:
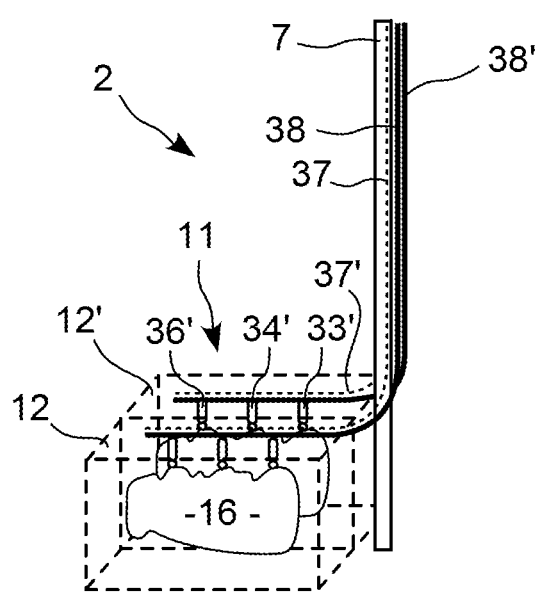
FIG. 12 is an overview of a system according to the invention when the first sail is stored in the storage space.

To this effect, the first conveyor 37 and the first rail 38 which appear more clearly in FIGS. 10 to 12 comprise a straight portion carried by the mast 7, but which is extended under this mast 7 in a curved portion itself extended by a horizontal extension located in the upper portion of the first compartment 12 of the space 11. Each slider 33, 34, 36 is displaced along the first rail 38 by the first conveyor 37 from its reference position along the mast, to the horizontal extension of this first rail 38 extending in the first compartment 12.

The storage of the first sail 3 is obtained by controlling the first conveyor to displace the sliders 33, 34, 36 along their rail, downwards. During this displacement, the lower portion of the folded wing 16 first reaches the foot of the mast 7, as in FIG. 10, to then follow the curved portion, as can be seen in FIG. 11, so as to be positioned entirely along the horizontal portion of this rail, i.e. in the first compartment 12.

The first conveyor 37 then forms with the sliders that it carries in the first rail 38 a means or a system carried by the mast 7 that is dedicated to the mooring, folding and storing of the first sail 3, as well as the deployment thereof. Similarly, the second conveyor 37' forms with the sliders that it carries in the second rail 38' a means or a system carried by the mast and which is dedicated to the mooring, folding and storing of the second sail 3' as well as the deployment thereof.

As can be seen in figures, the second sail 3' has the same general structure as the first sail 3, it also comprising a flexible wing, marked by 16', which is maintained by hangers and fitted with folding lines extending from its leading edge to its base unit, and sheets connected to an autonomous control member.

Additionally, the fixed station 2 is also fitted with a second socket not shown, to receive the base unit of the second sail 3', and the mast 7 also carries a second rail 38' provided with a second series of sliders for the mooring, folding and the storage of the second sail 3' as well as the deployment thereof.

The return, mooring, folding and storage of the second sail 3' takes place in the same way as for the first sail 3, but by using the second conveyor 37' to displace the sliders 33' 34' and 36' that it carries along the second rail 38', which terminates in the storing of this second sail 3' in the second compartment 12', the second rail 38' being extended in the second compartment 12'.

In practice, the sails are brought back and deployed one after the other: the second sail is brought back only once the first sail has been moored, folded and stored in its compartment, or before the return of this first sail as in FIGS. 10 to 12. The same applies for the deployment: the second sail is deployed once the first has been deployed and is at a sufficient distance from the ship, or before deployment of the first sail.

Generally, the deployment of each sail is obtained by carrying out the same returning, mooring, folding and storing sequences, but in reverse order.

Each conveyor is for example formed of a chain running alongside and/or guided in the rail wherein the sliders that this chain carries slide, this chain being displaced by a motorised and controlled drive system, and guided along this rail.

Optionally, the two rails 38 and 38' comprise a common vertical portion running alongside the mast 7. In this case, a directing at the base of the common vertical portion is provided to direct the first sliders to the curved portion then the horizontal portion of the first rail, and to direct the second sliders to the curved portion then the horizontal portion of the second rail.

Moreover, the first cable 4 and the second cable 4' have different lengths, in order to reduce the risks of interference between the two sails in the flight phase, i.e. when they are both deployed.

Additionally, these two sails are steered by their respective control members to move in different regions while still generating optimum traction. The two control systems can then both be connected to a steering system located at the fixed station, to exchange data with this system. In this case, the steering system transmits for example to each control member a definition of the region of the space in which it is to move.

Another possibility is to provide that one of the sails, for example the first sail 3 is master, and its control member 27 communicates with the control member of the second sail 3' by sending it a definition of the region of the space wherein it is to move. In this case, the first control member 27 has an operation of the master type and the second steering member an operation of the slave type.

Each control member steers the sail that it carries in order to have it move in the region of the space that is assigned to it, while still maintaining this sail in an optimum position that maximises traction.

In practice, a sail tends to spontaneously place itself close to the wind to a static position where it is maintained in a stable manner, but where it generates a traction force that is minimal, and when such a sail is in a position that generates more substantial traction, it tends to move away from this to go back to a static position.

Thus, maintaining such a sail in an optimum position that maximises traction, requires steering it dynamically in order to have it carry out turns so that it passes and passes again to the optimum position so as to maintain itself there.

In this context, the control members manoeuvre the sails in order to continuously maintain them in their optimum positions by carrying out turns according to so-called eight-shaped trajectories, these trajectories being shown in FIG. 2 where they are marked by T and T'.

When a wing describes an eight-shaped trajectory, it accelerates in the straight portions and slows down in the curved portions of this trajectory, which generates a periodic variation in the traction which is penalising in terms of fatigue on the elements subjected to the traction forces at the fixed station.

In other words, the intensity of the traction force generated by a wing steered according to an eight-shaped trajectory has an undulated shape, which stresses in fatigue the fastening elements of the fixed station on the deck of the ship, through which the traction forces are transmitted to the ship.

Advantageously, the control members of each sail are configured to de-phase the movements of the two sails when they are both carrying out eight-shaped trajectories, which makes it possible to substantially reduce the undulation of the cumulative traction forces of the two sails. This dephasing consists of ensuring that when one of the sails is passing through a straight portion of its eight-shaped trajectory, the other sail is on the contrary in a curved portion of its own trajectory.

What is claimed is:

1. Traction system, notably for a ship, comprising a fixed station (2) and at least one first sail (3) and one second sail (3'), the first sail (3) comprising a wing (16) and being connected to a winch (8) of the fixed station (2) by a first traction cable (4), the second sail (3') comprising a second wing (16') and being connected to a winch (8') of the fixed station (2) by a second traction cable (4'), the fixed station (2) including a mast (7) carrying first means of mooring (33, 37, 38) the first wing (16) to this mast (7), and second means of mooring (33', 37', 38) the second wing (16') to this mast (7).

2. System according to claim 1, wherein the mast (7) further carries first means for folding (34, 36) the first wing (16), and second means for folding (34', 36') the second wing (16').

3. System according to claim 1, wherein the first means for mooring and/or for folding the first wing (16) comprise a first conveyor (37) carrying first sliders (33, 34, 36) sliding in a first rail (38), and wherein the second means for mooring and/or for folding the second wing (16') comprise a second conveyor (37') carrying second sliders (33', 34', 36') sliding in a second rail (38').

4. System according to claim 3, wherein the first rail (38) and the second rail (38') comprise a common portion.

5. Traction system according to claim 1, wherein the fixed station (2) comprises a first winch (8) receiving the first traction cable (4) and a second winch (8') receiving the second traction cable (4').

6. System according to claim 1, comprising a drive motor (13) coupled to the two winches (8, 8') by means of transmission arranged to selectively drive one or the other of the two winches (8, 8').

7. System according to claim 1, wherein the fixed station (2) is mounted to be able to pivot about a vertical axis, with respect to the support on which this fixed station (2) is installed.

8. System according to claim 1, wherein the first cable (4) and the second cable (4') have different lengths when the wings are in traction phase.

9. System according to claim 1, comprising means for steering configured to maintain each sail (3, 3') in an optimum position that maximises the traction generated by this sail (3, 3'), by repetitively describing eight-shaped trajectories (T, T') passing through this optimum position.

10. System according to claim 9, wherein the means for steering are configured to de-phase the eight-shaped trajectories (T, T') described by the two sails (3, 3').

* * * * *